United States Patent [19]

Deir et al.

[11] Patent Number: 5,700,858
[45] Date of Patent: Dec. 23, 1997

[54] PLASTISOL PAINT AND METHOD OF USE

[76] Inventors: Thomas Deir, 1033 Lunaai St., Kailua, Hi. 96734; John Pitre, 46-35 Kahala Ave., Honolulu, Hi. 96816

[21] Appl. No.: 587,896

[22] Filed: Jun. 8, 1995

[51] Int. Cl.$^6$ ............... C08K 5/12; C08L 33/13
[52] U.S. Cl. ............ 524/297; 524/296; 524/523
[58] Field of Search ............ 524/296, 297, 524/523

[56] References Cited

U.S. PATENT DOCUMENTS

| | | | |
|---|---|---|---|
| 2,934,509 | 4/1960 | Crissey et al. | 524/297 |
| 3,175,989 | 3/1965 | Cannon et al. | 524/296 |
| 3,701,746 | 10/1972 | Johnson et al. | 524/296 |
| 4,210,567 | 7/1980 | Kösters | 524/297 |
| 5,155,154 | 10/1992 | Krummel et al. | 524/296 |
| 5,298,542 | 3/1994 | Nakamura et al. | 524/296 |
| 5,306,755 | 4/1994 | Yau et al. | 524/296 |
| 5,324,762 | 6/1994 | Overend et al. | 524/296 |
| 5,441,994 | 8/1995 | Morisa et al. | 524/296 |
| 5,475,056 | 12/1995 | Koesters et al. | 524/296 |
| 5,521,239 | 5/1996 | Handl | 524/296 |

FOREIGN PATENT DOCUMENTS

| | | | |
|---|---|---|---|
| 0342562 | 11/1989 | European Pat. Off. | 524/296 |
| 2454235 | 5/1976 | Germany | 524/297 |
| 3903669 | 7/1990 | Germany | 524/296 |
| 0038870 | 3/1982 | Japan | 524/297 |
| 0046974 | 2/1992 | Japan | 524/296 |
| 0979551 | 12/1982 | U.S.S.R. | 524/297 |

*Primary Examiner*—Peter Szekely
*Attorney, Agent, or Firm*—Rines and Rines

[57] ABSTRACT

A novel wet, buttery plastisol paint with a critical formulation and range of viscosity that enables the paint permanently to stay moist both on the canvas and palette, and novel method of using the same, with heat-curing to harden the paint before, after and during the painting process, as desired.

11 Claims, 1 Drawing Sheet

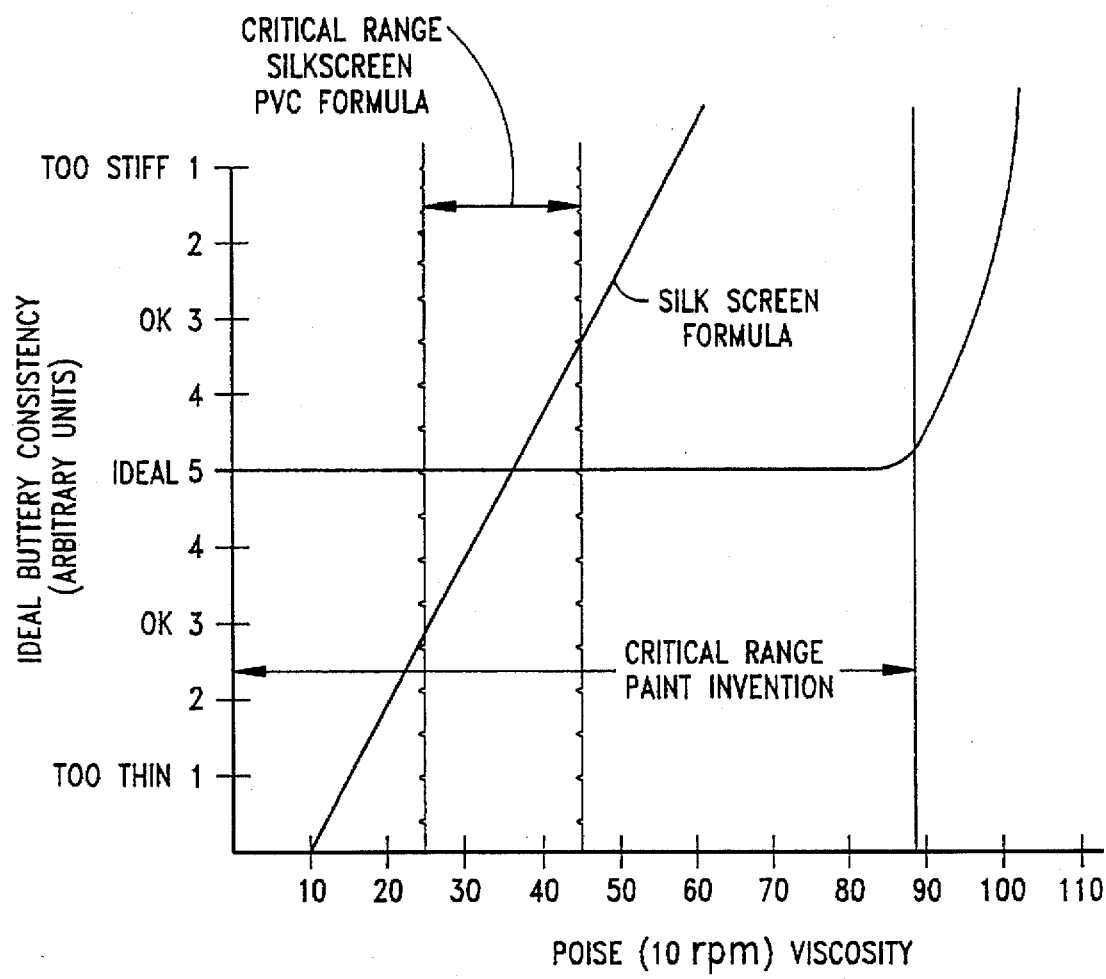

PLASTISOL PAINT AND METHOD OF USE

The present invention relates to plastisol type paints suitable for the use of artists in painting upon canvas and other surfaces, and, in particular, such paints embodying binders derived from or based upon acrylic polymers and copolymers, such as polymethyl methacrylate, or more broadly, polyalkyl methacrylate and the like; and to methods of artistic use of such paints.

BACKGROUND

Polymethyl methacrylate and similar acrylic paints have been widely and successfully used by artists in their development of paintings on canvas and other surfaces by brush, spatula and the like. Through the past many decades, the accepted techniques have all required the periodic cleaning of brushes and palette and the remixing of new quantities of the various colored paints to replace the dried and drying supplies and brushes. Similarly, the drying of the paint on the canvas has inherently demanded the application by the artist of fresh paint to cover, change or modify the dried paint of previously painted areas to obtain the ultimate desired effects.

Underlying the present invention, is a discovery that promises to revolutionize the technique of painting by enabling the paint permanently to stay fresh, moist and useable, without periodic palette cleaning and replacement (and sometimes even brushes); and, perhaps more importantly, to maintain the paint on the canvas fresh and moist and thus readily manipulative and miscible with added paint, and until the artist finally desires permanency to set or harden the paint by appropriate heat application to the canvas. This novel result is attained through a rather critical modification of the constituents of prior plastisols of this character, and with optimum regions of viscoelasticity.

While earlier acrylic copolymers based on methyl methacrylate have been applied as a binder for polyalkyl methacrylate plastisols for such applications as silk screen printing, transfer, undercoating, and foamed applications, as described, for example in the Rohm Tech Inc. product data charts for types 4899-F and M914 acrylic copolymer binders, and in German Patent DE 2722752, such products have been found to be unsuited to the problems attendant upon an artist's use of the same; particularly, to brush paint with widely varying and random thickness of paint application and subject to the force of gravity acting upon the same on steeply inclined canvas and other surfaces. The very nature to the process of brush (or spatula) painting moreover is quite distinguished from horizontal uniform-layer silk screen printing where the paint is squeezed through the fabric and not layered on by brush strokes or the like.

OBJECTS OF INVENTION

The principal object of the present invention, accordingly, is to provide new and improved preferably acrylic plastisol gummy paints having novel properties, including critical ranges of viscoelasticity and novel heat-curing response, particularly suited for use by artists in brush and palette knife painting of canvasses and the like; and to novel methods of use thereof by the artist.

Other and further objects will be explained hereinafter and are more particularly delineated in the appended claims.

SUMMARY

From one of its aspects, the invention involves a normally permanently wet and buttery artist's paint comprising a plastisol containing a gummy binder mixed therein in proportion sufficient to produce a paint viscosity in the range preferably of from about 16 Poise (10 rpm) to about 89 poise (10 rpm and 2.5 rpm), and heat curable in a temperature range of from about 175° F. to about 400° F. The plastisol is maintained free of fillers or adhesive substances, like PVC, that render the product sticky or tacky. The terms "buttery" or butter-like and "gummy" or gum-like are herein defined to describe the smooth butter-like spreadable novel characteristics of the paint of the invention, as contrasted with the tacky, pastey or sticky properties of prior paints.

The new paint of the invention is intended to replace most existing paints used today, such as oil paint, water color, acrylic, gouache, air brush and silk screen paints, all with one paint medium that is far more versatile and easier to use than traditional paints. It allows the artist complete control over the drying characteristics of a painting. It is made up of a modern sophisticated thermoset plastics with a formula based on the concept of plastisols (heat-cure paints and inks) but, with a unique and propriety chemical composition designed specifically to meet the needs of fine commercial artists.

As such, the novel paint composition of the invention allows an artist greater versatility, spontaneity and speed than is possible with the existing traditional media. It will never dry or get tacky during and after application, remaining in a flowing and soft buttery or honey-like state indefinitely until the artist desires to harden and cure the paint. This is accomplished in less than 10 minutes using a heating apparatus designed for this product, later described.

Its smooth buttery and non-tacky texture can be applied using any traditional painting technique, brush, palette knife, or it can be thinned down for gouache, air brush and used as a watercolor. It also has an advantage over conventional watercolors because it can be blended anytime after application and then cured immediately; something that is impossible with traditional watercolors.

It is ideal for classical glazing techniques. The invention provides the luxury of being able to overglaze a painting using a paint that stays wet indefinitely and then to cure it any desired time. In addition, the process may be repeated as may times as desired, such having been impossible with prior paints. Spot drying of small isolated areas is also possible using a special heating gun. This instant curing process, moreover, enables the artist to glaze and cure a painting as may times as he or she wants, as fast as required, and all in one session.

The paint is made up of molecule-sized plastic particles, pigments and special non-drying oils and absent sticky or tacky constituents, mixed together to form a buttery liquid or paste. It can be cured into one continuous hard permanent film by raising its temperature to the melting point and then allowing it to cool. This causes the molecules or isolated particles to bond forming one continuous super-tough permanent layer.

To effect the cure, heated elements may be passed or positioned over, or preferably under the surface of the painted material sufficiently to raise the temperature of the material to cause melting fusion and bonding of the molecules, as later more fully explained in connection with inexpensive and easy to use mechanisms, including electrical coils, preheated forced air, burning of gasses, heat lamps and other techniques.

As before stated, while similar to plastisols used for silk screen inks, the composition of the invention provides uniquely different qualities. There are inherent problems in trying to use conventional plastisols, indeed, to make them acceptable for use by an artist for fine arts work—the purpose of the present invention. Examples are value shift (darkening and or lightening from its wet state to a cure) and maintenance of color from its non-cured state to is cured state; smoothness of application (stickiness); and others, before and later described. All these problems have been remarkably obviated by utilizing unique and special forms of plastics, oils, and additives and proportions in place of the elements that are normally used in plastisols, to make the novel painting medium of the invention.

Since this paint system of the invention stays wet indefinitely until radiant heat-setting as later described, it permits a palette system with an elaborate series of many highly sophisticated colors that will stay wet and available on an artist's palette, previously impossible under conditions of air drying (hereinafter defined as "normally permanently wet").

We have successfully prepared, as an example, ten of the most useful colors broken down into ten value steps, each from the lightest possible shade to the darkest, premixed, and organized in a palette system for the artist's convenience. This extremely sophisticated and easy to use system is only possible due to the ability of the paint of the invention to stay wet indefinitely at room temperature. The luxury of being able to start each session with a sophisticated palette ready to go, is an artist's dream, since the preparation of the paint (prior to each session) fresh is extremely time-consuming and frustrating.

The novel paint, furthermore, is also an outstanding brush conditioner. By leaving the paint in the brushes, rather than going through the laborious and time-consuming tasks of washing and cleaning after each session, the paint actually extends brush life and keeps brushes well formed. Since the artist doesn't have to wash brushes, he or she can use many different types of brushes for more sophisticated results.

The invention paint base itself, in addition, lacks worrisome toxic properties, with no fumes or odors. A recommended universal solvent for the paint is mineral spirits, the purest and least toxic of all petroleum base solvents. Mineral spirits also have an extreme advantage in that it is very slow drying, and may be used also as a brush wash and thinner.

Improved and best mode formulations and techniques are hereinafter described in detail.

DRAWINGS

The invention will now be described in connection with the single drawing, presenting a graph of the critical features of performance of the novel paint of the invention.

PREFERRED EMBODIMENT(S)

As before described, the invention provides a permanently moist or wet and viable buttery and non-tacky plastisol-based paint (conventionally colored, as desired), preferably containing a polyalkylmethacrylate resin with plasticizer with novel rather critical constituent proportions and having characteristics, later explained, that render the paint buttery and non-sticky and suitable for the brush painting and other purposes of the invention.

In typical prior-art flat silk screen squeeze printing or transfer applications, or very different undercoating or similar applications, previously described, such binders are generally mixed with the polyalkyl methacrylate plastisol, producing an overall viscosity of the order of about 35 poise (10 rpm) as measured by a Brookfield RVT viscometer. Such can, for some applications, be combined with PVC to reduce environmental concerns and may also be used with adhesion promoters and crosslinkers for improved properties, generally having a sticky or tacky characteristic useful for screen printing as is well known, and mentioned in the before referenced Rohm product data sheets.

A typical artist's acrylic paint has the following constituents: Pigment dispersed in an emulsion polymerized acrylic resin Rhoplex AC234. *The Artist's Handbook of Materials and Techniques*, pp. 192, 402-Ralph Mayer. USA, Viking Penguin, Inc. 1988.

Such paints, as used on an artist's palette and brushes, generally start to dry and lose their pliability after exposure to the air for 10 minutes. When applied to the canvas in a painting, the paint brush lines, strokes, areas or smears generally dry within 10 minutes of painting. As before described, to revise, correct, supplement or modify the dried painting, the artist must apply fresh moist paint to cover the dried paint, as has been done for centuries with oil-based paints, and over many decades with acrylic paints, and with the attendant inherent disadvantages.

Through the incorporation of gummy binders in silk screen squeeze and flattening printing and transfer processes, previously discussed, the thin uniform layers of acrylic paint or ink left after squeezing through the fabric may be kept moist, and, after printing, dried with heat to fix, harden or cure the layer. The proportions of mixture of the constituents for such silk screen printing and related applications is generally as follows: 20–30 wt. parts Acrylic Polymer+30–40 wt. parts plasticizer+30–50 parts filler (PVC, pigment, etc.)—Rohm Tech Inc., PAMA plastisols,

APPLICATIONS AND PROPERTIES

For the purpose of such squeezed uniform thin layer horizontal printing or transfer, the recommended mixture has a viscosity in the range of 35 poise (10 rpm) such being appropriate for this type of application, and enabling viability during the process until heat is applied. Substantially lower and higher viscosities reduce the effectiveness for silk screening and related transfers.

As earlier described, however, for requirements of such a mixture to be used by an artist who brush paints upon an inclined canvas or surface, with widely varying thickness of paint application, and under the influence of gravity, such viscosity ranges have been found to be most inadequate.

While suited for flat thin printing, a low viscosity paint permits streaking and movement on an inclined canvas, particularly over time. So, also, with the storing of paint samples on a palette or artist's paint board.

Both there and on the canvas, moreover, the paint is subject to ultra-violet light and other radiation over extended time periods, sometimes weeks or months or more, tending to affect color values, tone and other appearance characteristics, such a problem not existing for prior art flat silk screen thin layer printing, transfer or other such uses.

The heat drying requirements of a painted canvas, in addition, are also at substantial variance from those suitable for the uniform thin-layer silk screening and related processes, as later more fully explained.

Applicants have discovered that an unexpected synergism takes place, that admirably solves all the above-mentioned problems residing in using such types of paint mixtures for canvas or similar surface brush knife or similar painting, with constituents proportioned to achieve a rather critical viscosity range and wet, buttery quality; and, in so doing, achieving protection and stability from the effects of ultra-violet light, even over long time periods of exposure, and requiring less and very different heat setting and temperature range limitations.

The maintenance of true and stable color values (light and dark) with non-discernible color shifts from wet to heat-dried status is another important and far reaching new result that synergistically flows from the formulation of the invention.

EXAMPLE 1

A wet buttery acrylic paint of the invention was formulated as follows: White: 103 wt. parts Dupont R900 titanium dioxide white pigment+65 wt. parts diisononyl phthalate plasticizer+equivalent mass base. A base of 49 wt. parts M914 (the before-identified Rohm Tech acrylic polymer based on polymethacrylate)+53 wt. parts plasticizer dioctylphthalate. Zero a fine grind on 3 roll mill. The volume ratio of pigment-plasticizer to acrylic polymer-plasticizer was about 1:1. It was found, further, that the approximately 1:1 ratio may be varied to ⅔:⅓ with acceptable results.

This paint was found to possess the above-mentioned synergism, having a non-tacky viscosity of about 51 Poise (10 rpm), a UV and wet-dry color change stability (500 hours sunlight, no shift in color, flexibility, or adhesion), and a requirement of only 250° F. heat with temperature limits of 400° F., thoroughly and permanently to harden the paint all over the canvas.

EXAMPLE 2

Black: 33.8 wt. parts Engelhard 7800 pigment 17.6 wt. parts diisononyl phthalate+the base as in example 1. Zero or fine grind on 3 roll mill. Result exactly the same as example 1.

EXAMPLE 3

Gray: Combine equal parts (volume) of example 1 and 2 to form a gray. No difference in UV stability (500 hours sunlight), although 2% shift in value from light to dark. Acceptable in comparison to acrylic paint (10%) and silk screen PVC paint (10%). Replacement of M914 with Rohm Tech acrylic copolymer 4899F based on methylmethacrylate minimizes color/value shift further (1.2%).

EXAMPLE 4

Blue: 8.3 parts Engelhard 4863 pigment+9.36 wt. parts Kodak dioctyl phthalate plasticizer and mix on a 3 roll mill to zero grind. Add equal volume parts to 49 wt. parts Rohm Tech 4899F acrylic copolymer (milled w/3 roll mill zero grind)+53 wt. parts Kodak diocryl phthalate. Results same as in Example 1.

The broad range of viscosity within the mixtures that can be used for the purpose of the present invention above-described is plotted in the drawing with the limited viscosity range useful for silk screening applications; and at the far end, demonstrating the unsuitability of much thicker viscosities for the purposes of the invention.

The preferred heat-drying process and temperature limitations, moreover, are effected as follows, with a special design of heating apparatus for the curing of the paint invention on canvasses and other flat surfaces.

It should be observed that the surfaces of artist canvasses and boards can be of significant size, far exceeding that of most T-shirt screening needs—some canvasses being 30–40 inches and larger. Common heaters for plastisols normally radiate heat down, and require 220 volt electrical current which is extremely dangerous in many aspects.

To satisfy the above critical needs, a special heater was created for canvasses and the like painted with the product of the invention that consists of a very large heating blanket, with very low watt density requirements, permitting the use of home 110 volt power. This heating blanket is placed on the bottom of a sealed box taking advantage of the phenomenon of heat tending to rise. The painting is placed face down within the close proximity of the blanket heater making for an extremely efficient heating source that can be of significant size, and requiring only common household current.

The combination of the rising radiant heat and also the use of the closed box oven accomplishes the task of curing, that would not be possible with conventionally available heaters for the plastisol market.

While oil paints are superior in minimum value shift in color from wet to dry state, the paint of the present invention is very much better than acrylic paints, including silk-screen type acrylics as shown in the following table.

| Paint | Typical Value Shift Stability (wet–dry) % |
| --- | --- |
| Oil-based | 0–2 |
| Acrylic | 10 |
| Silk screen acrylic PVC | 10 |
| The invention | 0–5 |

A further fortuitous discovery underlying the invention is that, in radically thinned viscosity ranges of about 3 Poise (10 rpm), also unsuited for the conventional screening and related prior art applications, brush painting somewhat in the nature of watercolors can admirably be effected using mineral spirits as thinner and solvent.

While described in terms of the preferred formulations, the paints may clearly use well-known equivalent plastisols gummy binders suited thereto, and further modifications will also suggest themselves to those skilled in this art, such being considered to fall within the spirit and scope of the invention as defined in the appended claims.

What is claimed is:

1. A method of using an acrylic plastisol as an artist's paint wherein said plastisol comprises polyalkylmethacrylate and an acrylic binder and pigmented plasticizer, said plastisol having a viscosity in the range of about 16 to 89 poise as measured by Brookfield RVT viscometer, 10 rpm, @ room temperature, and in which after room-temperature painting, the said plastisol is heated to a temperature in the range of about 250° F. to 400° F. permanently to harden the plastisol.

2. A method as claimed in claim 1 and in which said plastisol remains in a wet pliable state until heated.

3. A method as claimed in claim 1 and in which the viscosity is selected to be of the order of about 51 poise.

4. A method as claimed in claim 1 and in which the volume ratio of acrylic constituents to pigmented plasticizer is selected in the range of from about 1:1 to ⅔:⅓.

5. A method as claimed in claim 1 and in which the weight proportions in said plastisol of acrylic constituents and pigmented plasticizer are about equal.

6. A method as claimed in claim 1 and in which the plasticizer is selected from the group consisting of dioctylphthalate and diisononyl phthalate.

7. A method as claimed in claim 1 and in which the heating is effected by facing the painted plastisol toward a heat-radiating surface.

8. A method as claimed in claim 2 and in which, prior to painting, the plastisol is stored on an air-exposed paint board, remaining in a wet state until the plastisol is heated.

9. A method of using an acrylic plastisol as an artist's paint wherein said plastisol comprises polyalkyl methacrylate and an acrylic binder and pigmented plasticizer, said plastisol having a viscosity of about 3 poise as measured by Brookfield RVT viscometer, 10 rpm, @ room temperature, and in which the said plastisol may be painted in the manner of water colors, and then heated to a temperature in the range of about 250° F. to 400° F. permanently to harden the painted plastisol.

10. A method as claimed in claim 7 and in which the heat is radiated from a surface over which the painting is positioned.

11. A method as claimed in claim 10 and in which the heat-radiating surface and painting are disposed in a closed containiner.

* * * * *